United States Patent [19]

Albrecht

[11] Patent Number: 4,585,116
[45] Date of Patent: Apr. 29, 1986

[54] SLUDGE COLLECTOR FLIGHT, WEAR SHOE AND GUIDE LUG ASSEMBLY

[75] Inventor: Charles J. Albrecht, Taylors, S.C.

[73] Assignee: Dresser Industries, Inc., Dallas, Tex.

[21] Appl. No.: 700,429

[22] Filed: Feb. 11, 1985

[51] Int. Cl.⁴ .............................................. B65G 19/00
[52] U.S. Cl. ................................... 198/729; 198/734; 198/841; 308/3 R
[58] Field of Search ............... 308/3 R; 198/729, 719, 198/841, 731, 733, 734; 104/172 R; 187/95; 238/304, 310

[56] References Cited

U.S. PATENT DOCUMENTS 4,271,932  6/1981  Klein ..................................... 187/95

OTHER PUBLICATIONS

The Budd Co.-Single page identifying "Components", i.e. Sprockets, Wear Shoes,. Flights and Filler Blocks. Jeffrey-Dresser Catalog 1158-R Thermoplastic Link-Sludge Collector Chain.

Primary Examiner—Joseph E. Valenza
Assistant Examiner—Jonathan D. Holmes
Attorney, Agent, or Firm—Fred A. Winans

[57] ABSTRACT

A wear shoe and guide lug assembly for guiding a sludge collector flight along a return elevated rail is shown. Each wear shoe provides a readily replaceable member attached to the flight and providing alternative planar faces for bearing engagement with stationary rails on which the flight is dragged during operation. A guide lug is separably attached to the return wear shoe to extend below the wear face and adjacent one side of the wear shoe to define a lip for maintaining the flight against excessive lateral movement as the flight moves along the elevated rail.

5 Claims, 4 Drawing Figures

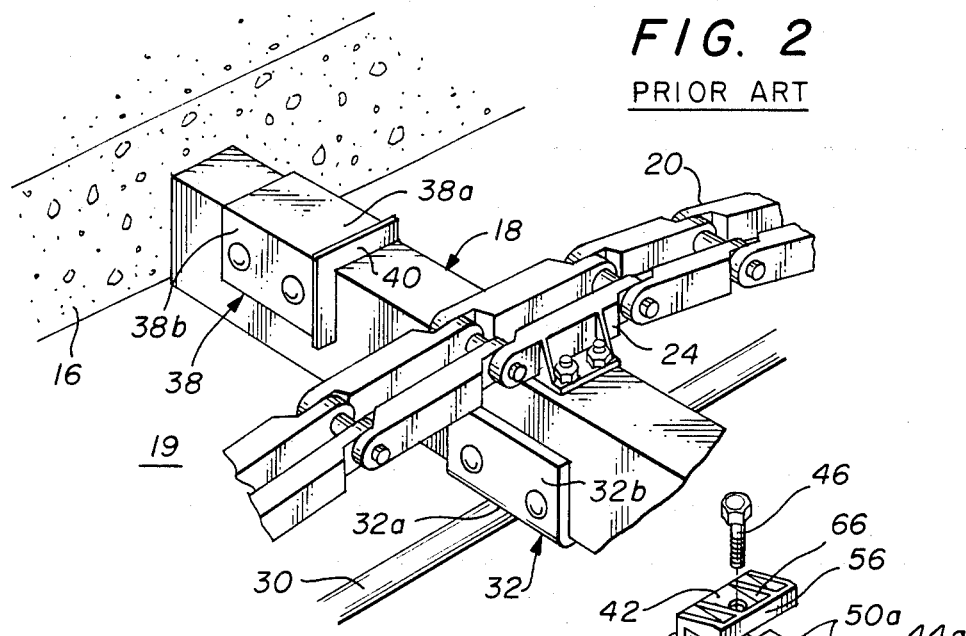
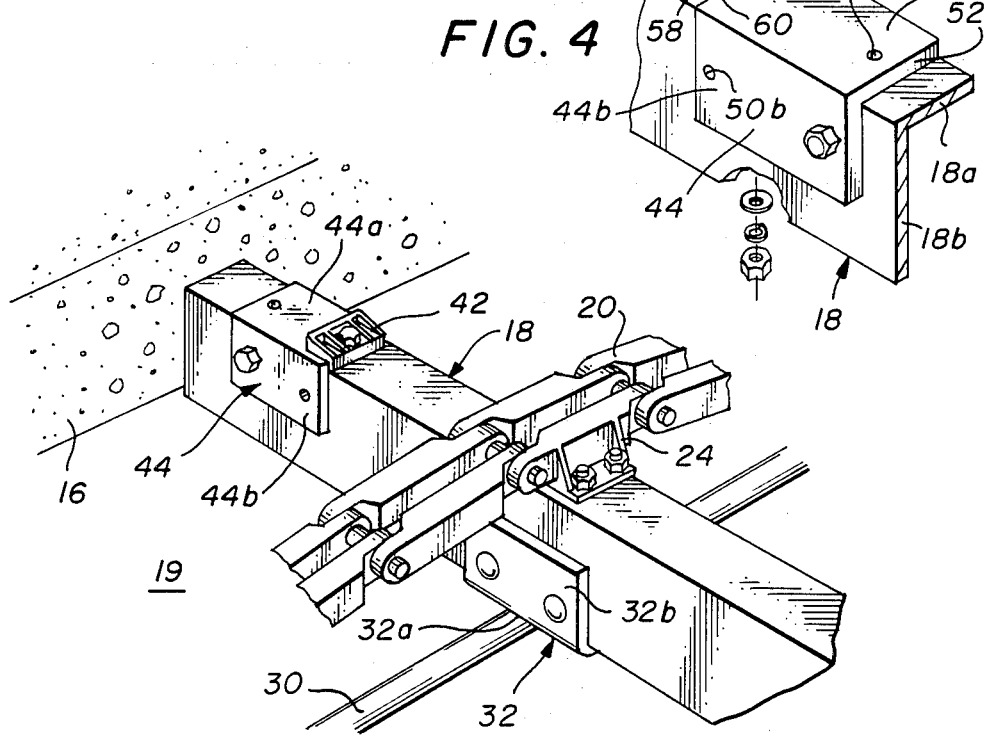

SLUDGE COLLECTOR FLIGHT, WEAR SHOE AND GUIDE LUG ASSEMBLY

BACKGROUND OF THE INVENTION

1. Field of the Invention

This invention relates generally to sludge collection apparatus and more specifically to wear shoes and guide lugs attached to the sludge collection flights for guided sliding movement of the flight along the elevated return rails of the sludge collector.

2. Description of the Prior Art

Sludge collection apparatus, of the nature of the present invention, generally includes molded plastic beams or flights, horizontally disposed and extending laterally across a sludge collection unit or cell forming a portion of a larger sludge tank having many such units disposed side by side in fluid communication. The flights of each unit are connected to an endless chain which is driven by a sprocket to drag the flights adjacent the bottom of each unit, to transport the settled sludge to one end of the unit for further treatment. At the end of travel of the flight adjacent the tank bottom, the chain and attached flights are guided to a return path along horizontal elevated rails.

The individual sludge collecting units, in their side by side relationship, are separated, adjacent the bottom, by short partitions therebetween running parallel with the direction of travel of the flights. Otherwise, the units are generally open for fluid communication between all the units of a single tank. The tank is generally fabricated of concrete, and therefore, rails are disposed in the floor providing a slight elevated ridge above the floor on which the flight can ride. The flights have attached thereto replaceable planar faced wear shoes secured in alignment with the floor rails to accept, on a easily removable and replaceable part, the wear caused by the sliding engagement. Also, the flights extend laterally so that the ends are generally adjacent the partition or sidewall of the unit which maintains the flight against excessive lateral movement, so that, within such permitted movement, the shoes and rails remain in engagement.

The flight also has attached to the opposite planar face a pair of replaceable wear shoes for protecting such opposite face of the flight against wear when it is being transported on the elevated return rails as the flights are dragged along their horizontal path back above the floor of the unit. However, as the return rails are above the partitions separating the unit, there are no sidewalls or partitions to maintain the flights against lateral movement. Thus, without lateral restraint, the return wear shoes and return rails could become misaligned causing wear on the flight itself; but, more critical, this misalignment may cause the flight to come into abutment with upper, intermittent rail support structure, causing the flight to become fractured or destroyed. Thus, it has been common practice to provide a lip extending below the planar wear surface of the return wear shoe for abutting engagement by the return rail to guide the flight on the return path against such excessive lateral movement. Heretofore, such lip was made as an integral unitary part of the wear shoe, such that the upper or return wear shoe could not be used as a bottom or floor wear shoe because the lip would engage and interfere with the bottom of the unit. Thus, the upper wear shoes were not interchangeable with the lower wear shoes.

BRIEF DESCRIPTION OF THE INVENTION

The present invention provides a wear shoe of generally "L" shaped cross-sectional configuration presenting two planar faces, either of which may be used for sliding engagement on the horizontal rails (either the floor rail or the return rail) and a separate guide lug to be assembled on those wear shoes attached on the flight to contact the elevated return rail.

DESCRIPTION OF THE DRAWINGS

FIG. 2 is an isometric view of a portion of a sludge collector flight having a wear shoe and integral guide according to the prior art;

FIG. 3 is a view similar to FIG. 2 with the shoe and guide lug assembly of the present invention; and FIG. 4 is an exploded isometric view of the wear shoe and guide lug assembly of the present invention.

DESCRIPTION OF THE PREFERRED EMBODIMENT

Figure 1:
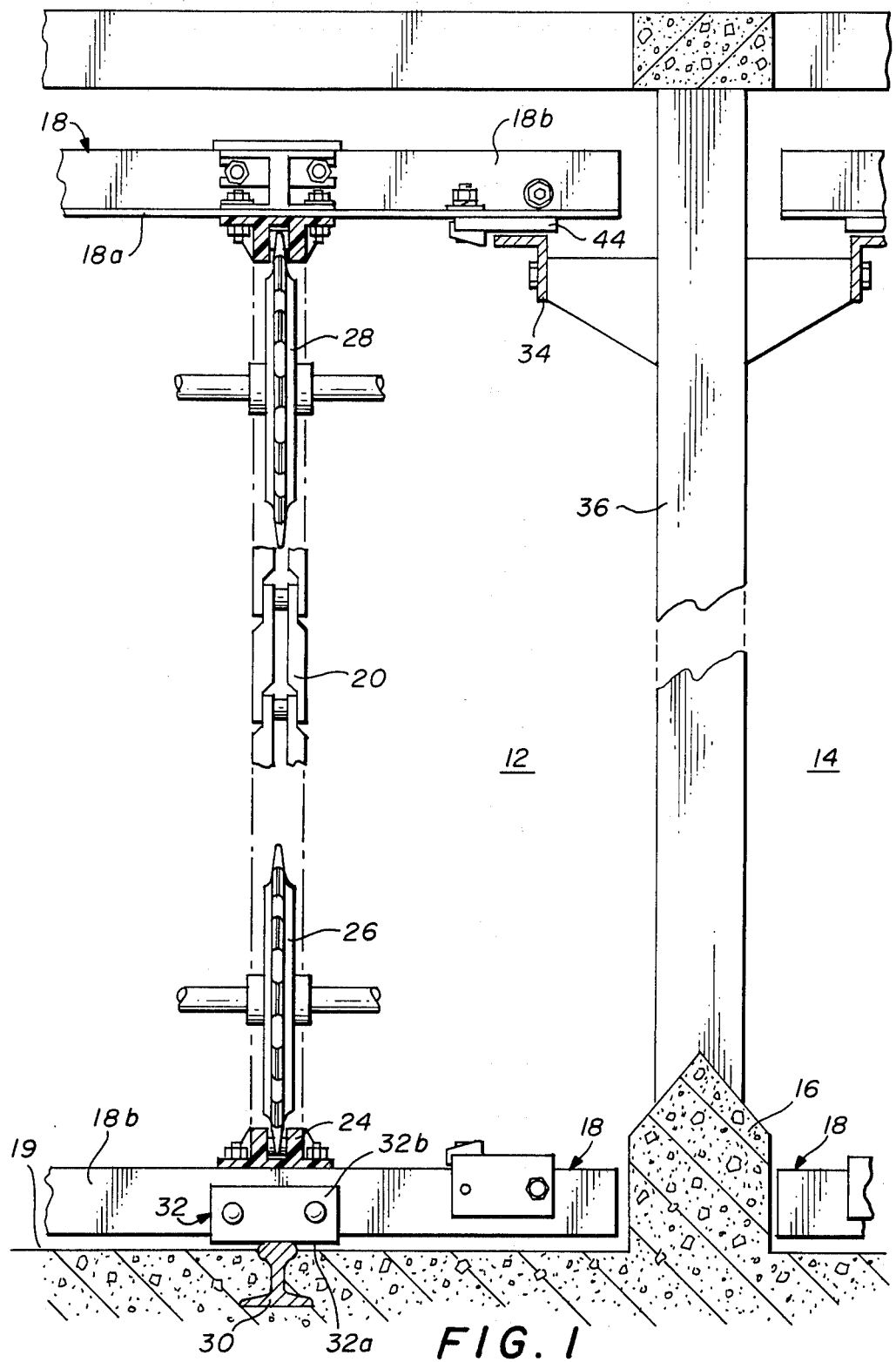
FIG. 1 is a partial elevational view of a sludge collecting unit.

Referring initially to FIG. 1, the portions of a sludge collector apparatus are shown which illustrate the environment of the present invention. As therein seen, the sludge collector includes a tank (only partially shown) defining a series of adjacent sludge collecting and settling units 12, 14 (two such units being partially shown) separated primarily by a short partition 16, all of which is, for the most part, constructed of concrete. The units of the sludge collector are maintained at an appropriate level with sludge, and as the solids therein settle to the bottom, they are scraped to one end of each unit, in a direction parallel with the partition 16, by movable flights 18 extending laterally across the bottom or floor 19 of each unit.

To this end, a plurality of flights 18 are attached at spaced intervals along an endless chain 20 (only one end of the flight 18 being shown, but it is to be understood a like chain is similarly attached generally adjacent the opposite end) through a special attachment link 24 of the endless chain bolted to the flight 18. The flights, although having no critical shape, are in this instance, generally L-shaped beams having a relatively short horizontal leg 18a and a generally longer vertical leg 18b (as viewed in FIGS. 1, 2, 3 and 4) with the vertical leg 18b providing the face for pushing or scraping the sludge.

Each flight 18 is pulled along the unit adjacent the floor 19 by the endless chain 20 extending between lower sprockets 26 (only one being shown) and then elevated to a return path by upper sprockets 28 (only one being shown) with at least one of the sprockets being driven for selective operation of the chain and flights.

Still referring to FIG. 1, it will be noted that as each flight 18 is moved along adjacent the floor 19, it rides on a rail member 30 embedded in the floor 19 and providing a relatively smooth elevated bearing surface which prevents the flight 18 from engaging the rough concrete floor. Also, it is noted that a replaceable wear shoe 32 having a generally "L" shaped cross section is attached to the flight by securing a vertical leg 32b thereof to the vertical face 18b, and with the other leg 32a defining a horizontal planar surface opposite the rail member 30 to ride on the rail and accept the wear caused by the relative movement between the flight 18 and the rail member 30. It is not particularly important what configuration or shape the lower wear shoe 32 has (i.e. an L-shaped shoe being shown), except that the lower wear shoe should not have any lower depending projections that would engage the floor 19 of the unit.

The L-shaped lower wear shoe above described is typical and, as will be appreciated, permits reversibility or the exchange of surfaces so that as the wear surface 32a becomes excessively worn, the shoe can be reversed and the attaching face 32b made the bearing face and the bearing face made the attaching surface.

It will also be noted that lateral or side-to-side movement of the flights 18 as they travel adjacent the floor 19, is limited by abutment between the flight ends and the adjacent parallel partitions 16 or side walls of the unit. However, it will be noted that as the flights 18 are transported above the units in the elevated return horizontal position, as shown in the upper portion of FIG. 1, the flights 18 are supported on outboard horizontal rails 34 extending parallel to the direction of travel. Rails 34 are shown to be supported on spaced pillars 36 (or the end wall of the unit) permitting fluid, i.e. sludge, communication between adjacent units.

As in the case of supporting the flight 18 for movement on the floor rail member 30 through lower wear shoes 32, replaceable upper wear shoes 44 (see FIG. 2 for such prior art wear shoe 38) are attached to each flight 18 to engage the return rail 34; however, as there are no corresponding partitions 16 to limit lateral movement of the flight 18 as it travels along the rails 34, it is apparent that the flight 18 may, due to slackness in the chain 20, move outwardly to such an extent that the shoe 44 and rail 34 would not be in engagement, causing direct wear on the flight 18. Also, such lateral movement could be extensive enough to cause abutment of the flight 18 with a pillar 36 supporting the rail 34 which would result in the destruction of the flight 18. To prevent such lateral movement, it is common to have the upper or return wear shoe 44 have a guide lip (see FIG. 2 for an integral unitary guide lip 40) extending below the shoe which would be engaged or abutted by the edge of the rail 34 during such lateral movement, to thereby limit the lateral movement of the flight 18.

Referring now to FIG. 2, a typical prior art upper or return wear shoe 38 is shown as attached to a flight 18 and is shown as it appears when the flight 18 is adjacent the bottom 19 of the unit. As with the previously described lower wear shoe 32 (also shown), the prior art return wear shoe 38 is configured to have reversible wear and attaching surfaces 38a and 38b respectively; however, it will be appreciated that the prior art guiding lip 40 was made unitary with the shoe 38 (i.e. as being molded as a unit), and thus, extended outwardly beyond both the attaching face 38b and the wear face 38a to attain such reversibility. It will further be appreciated that by exchanging the wear shoe 38 on one end of the flight 18 with a like wear shoe 38 on the opposite end of the flight, the shoes themselves are reoriented so that the surface 38a that was previously the wear surface would become the attaching surface through which the bolts would pass for attachment and conversely the attaching surface 38b would become the wear surface.

In the instant invention, as shown in FIG. 3, a guide lug 42 and return wear shoe 44 (also see FIG. 1) are made separable with the lug 42 replaceably attached as through a bolt and nut arrangement 46. Thus, the return wear shoe 44 of the invention can be reoriented at the same end of the flight 18 to reverse surface functions merely by turning the shoe so that the attaching surface 44b becomes the wear surface 44a and then reattaching the guide lug 42 to again extend below the wear surface. Further, it is apparent that with complete removal of the guide lug 42, the wear shoe 44 has no surfaces projecting outwardly from the wear surface 44a, and thus would be an appropriate wear shoe for the bottom wear shoe 32.

Referring now to FIG. 4, the detailed structure of the guide lug 42 and wear shoe 44 assembly of the present invention is clearly shown. As therein seen, the wear shoe 44 comprises an L-shaped configuration defined by two mutually perpendicular legs 44a, 44b, each having a planar outer surface. Each leg defines a pair of apertures 50a in alignment with like spaced apertures 50b in the other leg, all being equally spaced from the internal corner of the legs. The adjacent edges 52 of each leg 44a, 44b define a continuous co-planar surface.

The guide lug 42 defines two lips or shoulders 56, 58 extending in opposite directions from opposite ends of an intermediate web portion 60. The inner surface of the web portion 60 is substantially planar for abutting engagement with the planar outer surface of one leg 44a of the wear shoe 44. The inner surface of one lip 58 is likewise generally planar and extends perpendicular to the web portion 60 for abutting engagement with edge surface 52 of the shoe, and the opposite lip 56 has an external surface extending away from the shoe and defining the guide surface which abuts the upper rail 34 to limit lateral movement of the flight 18. The lug 42 has a generally centrally located aperture through the web portion 60 which aligns with any of the apertures 50a of the shoe 44 when the internal surface of the lip 58 properly engages the edge 52 of the shoe. Thus, a bolt 46 is passed through the aligned apertures and a like aligned aperture in the flight 18 to assemble the shoe 44 and lug 42 together and also attach them to the flight 18. One of the remaining apertures 50b in the mounting leg 44b of the shoe is also used for attaching the shoe 44 to the flight 18 as through a bolt and nut arrangement. Reinforcing ribs 66 extend behind the guide surface, integral with the guide shoulder 56, and the intermediate web. The lip 58 in abutment with edge 52 maintains the lug 42 from twisting or cocking once it is attached to the shoe.

Thus, a guide lug and wear shoe assembly is provided that comprises separable, reversible components, easily assembled and attached to a sludge collector flight. Further with each component having distinct requirements, i.e. the wear shoe must have substantial wear resistant qualities, unnecessary for the occasional rubbing or abutment of the guide lug, fabrication costs are decreased from a unitary wear shoe and guide lug configuration of the prior art.

I claim:

1. An improved wear shoe and guide lug assembly for use in a sludge collecting system having a collection flight, stationary support rail means, and wherein said wear shoe and guide lug assembly is attached to said flight for supporting and guiding said flight on said support rail means wherein said improvement comprises:

a wear shoe having a pair of generally mutually perpendicular leg portions, each portion having coplanar edges, said leg portions defining an inner surface for facing engagement with said collection flight and an outer surface, with the outer surface of each leg portion comprising a substantially planar surface;

a guide lug removably assembled to said wear shoe and disposed thereon adjacent one edge of said wear shoe and engaging the outer planar surface of one leg portion thereof and defining an outwardly projecting guide shoulder generally perpendicular to said wear shoe outer surface, and an inwardly extending lip defining a plane generally parallel to the plane of said shoulder and engaging said one edge of said wear shoe for alignment of said shoulder with said wear shoe; and aligned apertures in said shoe, guide lug and flight for receipt of attachment means for releasably attaching said shoe, lug and flight together.

2. Structure according to claim 1 wherein said wear shoe has an aperture adjacent each edge of each leg portion whereby said guide lug can be assembled by said attachment means to engage any of said edges.

3. Structure according to claim 1 wherein said lug means is fabricated as a molded plastic part.

4. An improved guide lug means for attaching to a wear shoe of a sludge collector flight of a sludge collector system further including stationary support rail means, and wherein said wear shoe supports said flight on said rail means and said guide lug means guide said flight along said rail means, wherein the improved guide lug comprises:

a central web portion having a generally planar surface for engagement with a planar wear surface of said wear shoe generally adjacent one edge of said shoe, said web portion terminating on opposite sides in oppositely extending shoulder means, one of said shoulder means extending generally from said wear surface outwardly and the other of said shoulder means extending and abutting said edge, and means for securing said lug to said shoe whereby said one shoulder means provides a surface for abutting said stationary rail means on which said flight is transported to limit the lateral movement of said flight with respect to said rail means, and the other shoulder indexes said guide on said shoe and prevents a skewed mounting.

5. Structure according to claim 4 including a plurality of integral strengthening ribs interconnecting said one of said shoulders to said web portion.

* * * * *